United States Patent Office 3,846,260
Patented Nov. 5, 1974

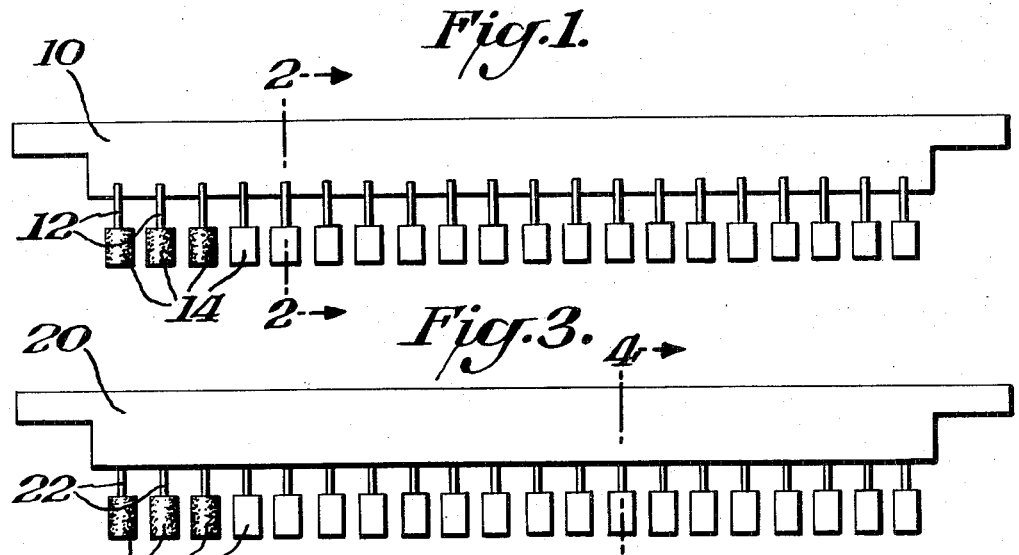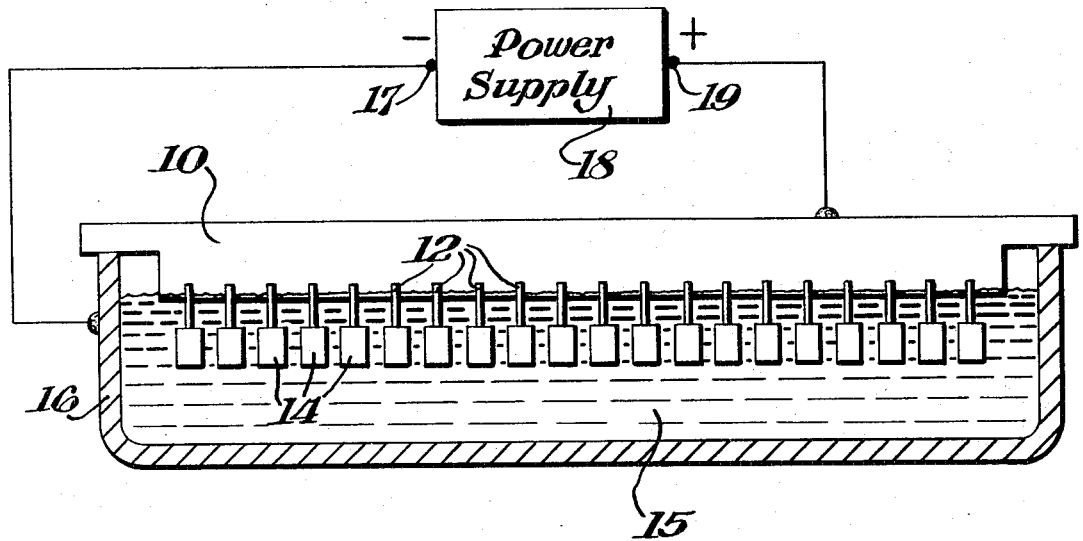

3,846,260
TANTALUM PELLET SYSTEM AND METHODS OF MAKING AND USING THE SAME
Walter J. Bernard, Williamstown, Mass., assignor to Sprague Electric Company, North Adams, Mass.
Filed May 18, 1973, Ser. No. 361,688
Int. Cl. B23k 31/02; C23b 5/56, 5/68
U.S. Cl. 204—25                                   7 Claims

ABSTRACT OF THE DISCLOSURE

A pellet system for use in the manufacture of solid electrolyte electrolytic capacitors comprises a bar and a plurality of sintered tantalum pellets, each having a short tantalum anode wire lead such that the closest separation between a pellet and the bar is no greater than 3/8 inch. Each wire lead is welded to the bar such that the pellets may be registered and held properly submersed in liquid processing baths. The material of the bar is a low cost aluminum-alumina composite material that readily forms a dielectric oxide film and that does not warp during the formation, pyrolysis, or other capacitor manufacturing processes.

BACKGROUND OF THE INVENTION

This invention relates to a tantalum pellet system and more particularly to a tantalum pellet system for use in manufacturing capacitors. Pellets in such a system are formed by compressing and sintering tantalum particles that are thereafter treated and processed so as to form a solid tantalum capacitor from each pellet.

A tantalum pellet carrier is normally employed throughout most of such capacitor manufacturing processes. The system is typically made by having the anode wire lead of each such pellet lap welded to a horizontal metal bar such that a multiplicity of pellets hang downward from the bar. Typically the bar is made of stainless steel.

Many of the process steps involve the immersion of the pellets into a liquid. A typical process is one such as that described by Millard in U.S. Letters Patent 2,936,514. The pellet carrier is usually lowered over the liquid such that the pellets are completely immersed with the bar being held by a fixture that registers the pellet carrier relative to the liquid container. The bar is thus not immersed. Immersion of the bar during the oxide forming step is especially undesirable since this would cause heavy current to flow between the electrolyte and the large surface area of the bar, paralleling and making difficult the control of the current to the pellets. Therefore the tantalum wire leads must be long enough to insure complete immersion of the pellets and no immersion of the bar, and this is obviously a function of the degree of control of the liquid level that is achieved.

Tantalum wire is expensive, costing on the order of fifty dollars a pound. Significant cost savings can be realized by reducing the length of the tantalum wire leads. However, the shorter the tantalum wire become, the more likely the pellet carrier bar is wetted by the electrolyte in regions near the point of the wire welds. This may occur as a result of electrolyte vapor condensation, splatter, or wicking or a combination thereof. When the bar of the pellet carrier is made of tantalum or another valve metal that forms a non-porous and self-sealing dielectric oxide film, the small leakage currents flowing to the bar may not adversely affect the control of the pellet oxide forming process; but when cheaper bars are made, for example of stainless steel, electrochemical reactions on the bar can permit very large currents to flow indefinitely, and the pellet forming process control thereby becomes seriously degraded. The reactions which can occur include oxygen evolution, the formation of conducting compounds, and anodic dissolution, the products of which can contaminate the electrolyte and degrade the quality of the capacitors.

Aluminum bars would seem to be a good candidate material to solve these problems. Aluminum is the least expensive and most readily available of the valve metals. However, aluminum bars soften and warp at the high temperatures employed for the pyrolysis of the manganous salts. Such warpage results in non-uniform immersion of the pellets in subsequent steps whereby for example the solid electrolyte may extend up a pellet wire further than did the oxide formation, causing an anode to cathode short.

Except for the expensive valve metals such as tantalum, there has heretofore been found no suitable material for making a pellet system bar that would accommodate short wire pellets.

It is a further object of this invention to provide a pellet system having short wire leads.

It is a further object of this invention to provide a pellet system having a bar that forms a self-sealing oxide film and which does not warp.

It is a further object of this invention to provide a low cost pellet system that permits a significant reduction in the cost of manufacturing solid tantalum electrolytic capacitors.

These and other objects will become apparent in the following description of the preferred embodiments.

The aforementioned objects are satisfied by the present invention as well as by the invention of my copending application Ser. No. 361,739 filed concurrent herewith.

SUMMARY OF THE INVENTION

A tantalum pellet system for use in the manufacture of solid tantalum capacitors comprises a metal bar and a plurality of sintered tantalum pellets each having a tantalum anode wire lead welded to the bar. The length of the lead between the bar and each pellet at their closest separation is no longer than 3/8". The bar is an aluminum-alumina composite material having from about two to fifteen percent alumina by volume and trace elements. The bar so made has an inherently low cost, and readily forms good dielectric oxide films, and will not warp during normal capacitor manufacturing processes including, formation, impregnation with manganous salts, pyrolosis, and application of the cathode electrode. This low cost bar material, advantageously having the aforementioned properties, permits the construction of a pellet system wherein the expensive wire leads may be made very short thus providing a further important economic advantage in the manufacture of solid tantalum capacitors.

In FIG. 1 is shown a tantalum pellet system according to a first preferred embodiment of this invention.

In FIG. 2 is shown a cross-sectional view of the system in FIG. 1 taken in section 2—2.

In FIG. 3 is shown a tantalum pellet system according to a second preferred embodiment of this invention.

In FIG. 4 is shown a cross-sectional view of the system in FIG. 3 taken in section 4—4.

In FIG. 5 is shown a cross-sectional view of a tantalum pellet system wherein the pellets serve as the anode electrode in an electrolytic cell.

DESCRIPTION OF THE PREFERRED EMBODIMENTS

Shown in FIG. 1 is a first preferred embodiment of the present invention. The metal bar 10 is made of a composite material composed of aluminum having trace elements and having alumina ($Al_2O_3$) particles dispersed homogenously throughout. The alumina is from two to fifteen percent of the total composite by volume. Each of a multicplicity of sintered tantalum pellets 14, has a conventional tantalum anode wire lead 12. Each wire 12 is essentially at right angles to the main axis of the bar 10 and all such leads 12 are essentially in the same plane. The wire lead 12 from each pellet 14 is lap welded to the bar 10. Thus a tantalum pellet system is constructed wherein the pellets 14, the tantalum anode wires 12, and the bar 10, are all electrically as well as mechanically interconnected. In FIG. 2 is shown a cross-sectional view of the system of FIG. 1 taken in section 2—2. The weld 11 is made in a region between the overlapping top portion of the wire lead 12 and the bottom portion of the bar 10. It is thus called a lap weld.

A second preferred embodiment is presented in FIG. 3, being similar to that of FIG. 1 except for a different manner, of interconnecting the wire leads with the bar. The tantalum pellets 24 each have a conventional tantalum anode lead 22. The wire leads are butt welded to the bottom edge of the bar 10. FIG. 4 shows a cross-section of the system taken in section 4—4 as shown in FIG. 3. The weld 21 joins the end of the wire lead 22 and the bar 10.

In FIG. 5 is shown a third preferred embodiment of a tantalum pellet system for use in forming an oxide over the surfaces and within the interstices of the tantalum pellets by electrolysis. The bar 10, the pellets 14, the tantalum leads 12, and their interconnections are as has been described for the system of the first preferred embodiment. The bar has a projection at either end. The assembly comprised of the bar 10, leads 12, and pellets 14 is suspended by those projections resting on the rim of a tank 16 such that the pellets hang downward and are completely submersed in a liquid electrolyte 15. The tank 16 is of stainless steel. A power supply 18 is connected between the bar 10 and the tank 16, with the positive terminal connected to the bar 10. Thus, the power supply is connected to an electrolytic cell wherein the pellets 14 act as the anode electrode and the tank 16 acts as the cathode electrode. The power supply 16 is a conventional constant voltage supply having a current limit feature. When the system is first connected to the power supply, the resistance of the cell is very low and a high current tends to flow. However, the power supply voltage automatically drops so as to keep the initial current at a limit to which it has been adjusted, which for example may be on the order of 1 ampere for each 20 pellets. As the oxide grows, the resistance of the cell increases until the current is less than 1 ampere for example and the power supply provides the constant voltage to the cell curing the rest of the oxide formation process step.

The electrolyte level is adjusted so that the pellets are completely submersed, and in fact that level may be so high as to encompass a portion of the bar with no deleterious effects on the pellet oxide forming process or the control thereof. It has been found that the best solutions for use as an electrolyte have a pH from between 5 and 7. Specifically a 0.1% aqueous solution of ammonium dihydrogen phosphate (ADP), was successfully employed as the electrolyte in the making of experimental capacitors.

The alloy of which the bars 10 and 20 are made in the first, second and third preferred embodiments, forms an impervious dielectric oxide of substantially equal quality to that of a tantalum bar for effective use in a pellet system. Its strength is much greater than that of aluminum alone, and it does not warp when exposed to temperatures as high at 450° C. This composite material is a result of the development of sintered aluminum powder (SAP) "alloys" beginning about twenty years ago. The tensil strength of about 40,000 p.s.i. is hardly affected by exposure to temperatures as high as 500° C. See paper entitled, "Recrystallization of Sintered Aluminum Powder" by J. G. McMullin, July 1954, General Electric Research Laboratory, The Knolls, Schenectady, N.Y. Although no such SAP alloys are presently being produced in large quantities to my knowledge, the inherently low cost of these materials, especially compared with tantalum, combined with their excellent film forming ability make them well suited for use in a tantalum pellet system.

A number of experimental pellet systems have been made according to the description of the first preferred embodiment. The bar 10 has the dimensions 10 inches long, ½ inch wide and 0.032 inch thick and was made from Alcoa Alloy XAP005 having 6% alumina, aluminum and trace elements. Tantalum pellets having tantalum wire leads of from 0.14 to .022 inches in diameter were uniformly spaced and lap welded to a side of the bar. The welds were made by a normal capacitor discharge type welder having one electrical connection to the bar and the other connection made through a standard maneuverable weld electrode. The length of tantalum lead overlapping the bar was about ⅛ inch. The length of tantalum lead between the pellet and the lower edge of the bar was about ¼ inch. The length of wire overlapping the bar should be no longer than necessary for reliably making the weld. About ⅛ inch is adequate.

The experimental systems were then used in a complete solid tantalum capacitor manufacturing process. Simultaneously, a standard system having bars made of stainless steel was used in a complete solid tantalum manufacturing process, so as to provide a control system for the experiments. The standard control system included pellets having tantalum wire leads of ¾ inch long, and a separation between bar and pellets of about ⅝ inch. While the experimental systems used a substantially smaller quantity of costly tantalum than the standard system, no significant differences were observed in the quality of the resulting capacitors.

The aforementioned aluminum-alumina composite bars possess far greater strength especially after exposure to the high capacitor processing temperatures, than pure aluminum. Their potential cost is far less than that of pure tantalum bars.

The use of a low cost aluminum-alumina composite bar, as taught in this invention, provides cost savings that may be realized by keeping the tantalum wire leads short. It has been shown that at least ¼ inch of tantalum wire can be saved by use of the tantalum pellet system of this invention in comparison with a standard system that employs non-valve metal bars such as stainless steel. In 1972 well over one hundred million solid tantalum capacitors were sold in this country and this rate appears to be strongly increasing. Based upon the ¼ inch of tantalum wire saving per capacitor and assuming the consumption rate of 1972, it is estimated that potential total savings in tantalum wire from the use of this invention would exceed a value of one million dollars.

What is claimed is:

1. A tantalum pellet system comprising a bar of composite material consisting essentially of aluminum and from two to fifteen percent alumina by volume; and a plurality of sintered tantalum pellets, each said pellet having a tantalum wire lead extending therefrom, each said lead being welded to said bar, each said lead lying essentially at right angles to the major axis of said bar, all said leads lying essentially in one plane, and the closest separation between each said pellet and said bar being ⅜ inch or less.

2. The tantalum pellet system of claim 1 wherein said composite material consists essentially of aluminum and about six percent alumina by volume.

3. The tantalum pellet system of claim 1 wherein said weld is a lap between each said lead and one side of said bar.

4. The tantalum pellet system of claim 1 wherein said weld is a butt weld between each said lead and a face of said bar.

5. The method of forming oxide films on the tantalum pellets of the system of claim 1 wherein said pellets are held by said bar and are completely submersed in a liquid electrolyte of an electrolytic cell, said pellets serving as the multiple anode electrodes of said cell.

6. A method of making a tantalum pellet system comprising the step of welding the wire lead from a tantalum pellet to a bar, said bar being made of a composite material consisting essentially of aluminum and from two to fifteen percent alumina by volume.

7. The method of claim 6 wherein said composite material consists essentially of aluminum and about six percent alumina by volume.

References Cited

UNITED STATES PATENTS

| | | | |
|---|---|---|---|
| 2,936,514 | 5/1960 | Millard | 29—570 |
| 3,573,566 | 4/1971 | Fournier et al. | 29—570 |
| 2,830,698 | 4/1958 | Coda et al. | 29—193.5 |
| 3,224,071 | 12/1965 | Levi et al. | 29—155.5 |

JOHN H. MACK, Primary Examiner

W. A. LANGEL, Assistant Examiner

U.S. Cl. X.R.

29—504, 570; 204—286

UNITED STATES PATENT OFFICE
CERTIFICATE OF CORRECTION

Patent No. 3,846,260   Dated Nov. 5, 1974

Inventor(s) Walter J. Bernard

It is certified that error appears in the above-identified patent and that said Letters Patent are hereby corrected as shown below:

The term of this patent subsequent to October 22, 1991, has been disclaimed.

Signed and Sealed this

Seventeenth Day of August 1976

[SEAL]

Attest:

RUTH C. MASON
Attesting Officer

C. MARSHALL DANN
Commissioner of Patents and Trademarks